(12) United States Patent
Lamberti et al.

(10) Patent No.: US 6,575,851 B1
(45) Date of Patent: Jun. 10, 2003

(54) REBOUND WALL FOR BALL SPORTS

(76) Inventors: Catherine B. Lamberti, 1324 State St., #J188, Santa Barbara, CA (US) 93101; Steven E. Muenter, 5719 Burnet Ave., Van Nuys, CA (US) 91411; Harold D. Pierce, 1301 Falling Star Ave., Westlake Village, CA (US) 91362

( * ) Notice: Subject to any disclaimer, the term of this patent is extended or adjusted under 35 U.S.C. 154(b) by 111 days.

(21) Appl. No.: 09/643,394

(22) Filed: Aug. 22, 2000

Related U.S. Application Data

(60) Provisional application No. 60/150,916, filed on Aug. 26, 1999.

(51) Int. Cl.[7] ............................................. A63B 69/00
(52) U.S. Cl. ....................................... 473/435; 273/395
(58) Field of Search .................. 473/415, 434, 473/435, 446, 456

(56) References Cited

U.S. PATENT DOCUMENTS

| 100,962 | A | * | 3/1870 | Adams | .................. | 40/721 |
|---|---|---|---|---|---|---|
| 2,104,550 | A | * | 1/1938 | Bates | .................. | 52/580 |
| 2,228,363 | A | * | 1/1941 | Pinney | .................. | 52/580 |
| 4,103,436 | A | * | 8/1978 | Strussion et al. | .................. | 434/151 |
| 4,333,646 | A | * | 6/1982 | Pfeilsticker | .................. | 473/435 |
| 4,956,775 | A | * | 9/1990 | Klamer et al. | | |
| 5,336,959 | A | * | 8/1994 | Park et al. | .................. | 310/328 |
| 5,402,999 | A | * | 4/1995 | Keehn, Sr. | .................. | 473/472 |
| 5,509,650 | A | * | 4/1996 | Mac Donald | .................. | 473/446 |
| 5,605,336 | A | * | 2/1997 | Gaoiran et al. | .................. | 273/445 |
| 5,934,679 | A | * | 8/1999 | Strain et al. | .................. | 273/395 |

* cited by examiner

*Primary Examiner*—Paul T. Sewell
*Assistant Examiner*—M. Chambers
(74) *Attorney, Agent, or Firm*—Jack C. Munro

(57) ABSTRACT

A rebound wall for a ball sport game permitting a player to hit a ball to the rebound wall and upon the ball rebounding to again hit the ball. The wall is to include sensors and transducers which can calculate and display scoring values based on where the ball strikes the rebound wall. A player can utilize the wall by himself or herself or with other players or with other players exteriorly of its location by connection electronically of the wall to a central location which is also connected to other walls.

8 Claims, 3 Drawing Sheets

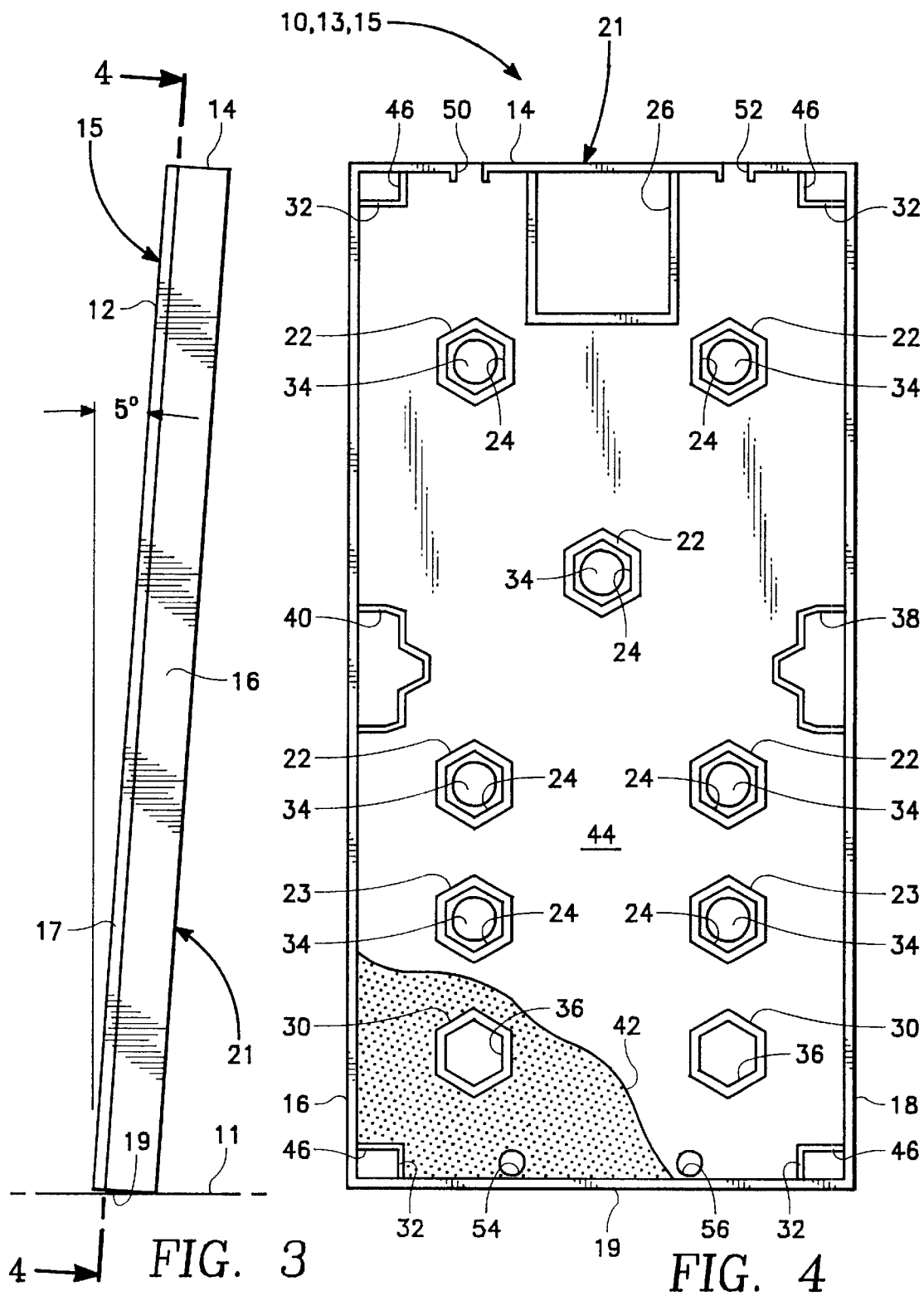

REBOUND WALL FOR BALL SPORTS

REFERENCE TO PRIOR APPLICATIONS

This application is based on provisional patent application Ser. No. 60/150,916, filed Aug. 26, 1999, by the same title and same inventors.

BACKGROUND OF THE INVENTION

1) Field of the Invention

The subject matter of this invention is directed to a wall that can be used to rebound a ball to an individual that is propelling the ball into the wall or to an adjacent individual and also a way to use the wall to match the player's skills against competitors throughout the world.

2) Description of the Prior Art

Backboards or rebound walls for ball sports have long been known. Typically, such walls have been used within the game of tennis. However, prior to the present invention, it has not been known to electronically activate the wall so as to have the player to be able to play different games and also to keep score. Further, electronic activation permits the wall to be used in competition with other players. A typical rebound wall constitutes no more than a planar wall which is mounted in a vertical upright manner with the player then to strike the ball to the board, and when the ball rebounds to rehit the ball again to the board. This permits the player to work on his or her game without the need of an opponent.

In the past, prior art non-permanent installations of rebound walls had a major disadvantage in the fact that substantial noise was emitted when the ball struck the wall. This can become annoying to individuals located nearby that are not using the wall. There is a need to construct a rebound wall that produces minimal noise and enjoys the advantage of a permanent wall installation in regard to noise transmission.

SUMMARY OF THE INVENTION

A rebound wall constructed of connected together panels that are mounted in an edge abutting relationship forming, in essence, forming a single wall structure although a single panel could be used as the rebound wall. Each panel of this wall includes a plurality of target areas and a plurality of transducers. The target areas are to be individually illuminated to have a player propel a ball to that particular target area. The transducers are to be used to calculate the location of where the ball strikes the panel. Each of the panels is constructed be filled with a weighted material to increase the mass of the panels in order to deaden or muffle the sound of the ball striking the wall plus increase rigidity of the panel and increase stability primarily to counteract wind load. Electronics are to be incorporated within the wall to display information such as time, score, ball speed and players identification as the game is played. Rebound walls at different locations can be electronically connected to a center location so that competition can be held between players at different locations.

One advantage of this invention is that the rebound wall is comparatively inexpensive relative to a permanent installation.

Another advantage of this invention is that the rebound wall offers the advantages of a permanent installation but yet the rebound wall is portable and can be moved to another location.

Another advantage of this invention is that the performance of the rebound wall in relation to sound transmission is equivalent to a permanent wall installation.

BRIEF DESCRIPTION OF THE DRAWINGS

FIG. 3 is a right side view of the panel assemblage of this invention taken along line 3—3 of FIG. 1 showing the tilting of the panels relative to vertical;

FIG. 4 is a front view with front section removed of a single panel within the assemblage of FIG. 1 taken in the direction toward the back section of the panel of this invention taken along line 4—4 of FIG. 3.

DETAILED DESCRIPTION OF THE INVENTION

Figure 1:
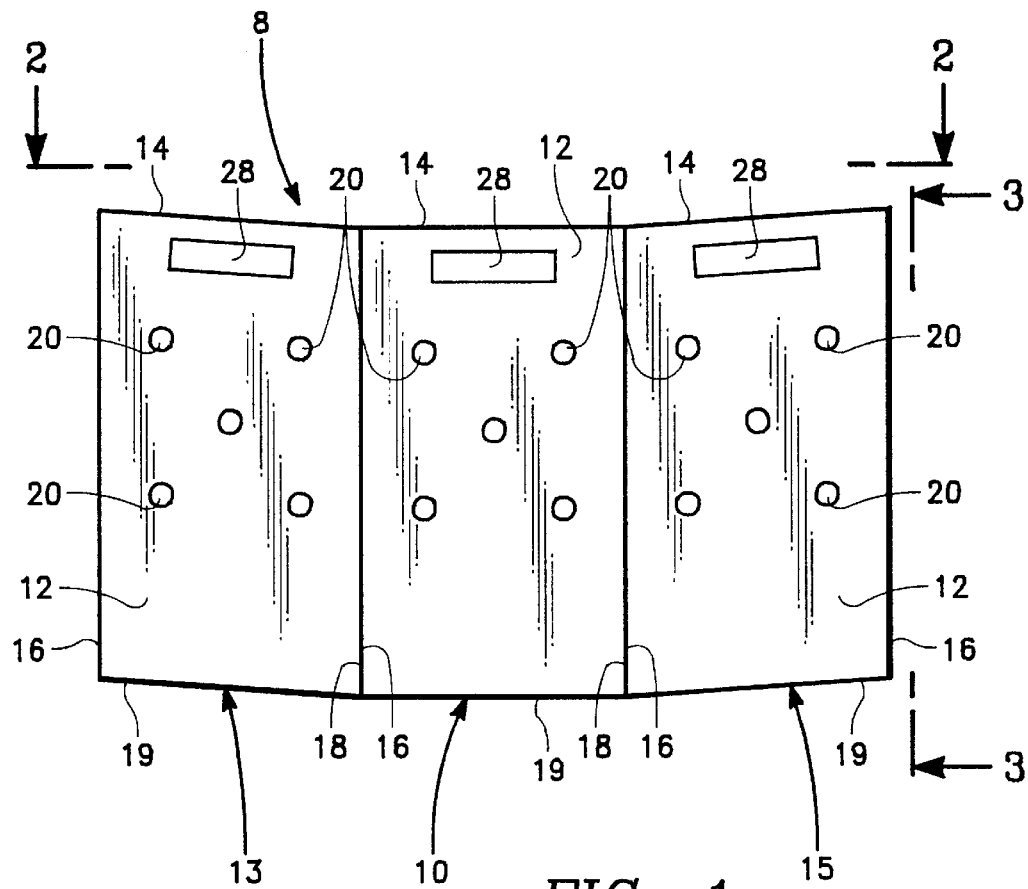
FIG. 1 is a frontal exterior view of an assemblage of a master panel and a pair of slave panels of the rebound wall constructed in accordance with this invention.

Referring particularly to FIG. 1, there is shown the rebound wall 8 comprised of a series of thin panels in edge abutting arrangement that are mounted in a stood up position on a supporting surface 11 with the bottom edge 19 of the panels located directly adjacent the supporting surface 11. There actually will be some form of a base that connects with the bottom edge 19 that supports each panel on the supporting surface 11, which is not shown. The panels are divided into a master panel 10 and a pair of slave panels 13 and 15. The master panel 10 is located between the slave panels 13 and 15. All panels 10, 13 and 15 are constructed identically. Although three in number (panels 10, 13 and 15) of panels are shown, there may be used a greater number (such as five) or a lesser number (such as one) with three in number being typical. It is to be noted in referring specifically to FIG. 2 that both slave panels 13 and 15 are angularly displaced at about four degrees relative to the master panel 10. This produces a slight concave shape facing the player. The player will normally be located in some spaced distance in front of master panel 10. When the player propels a ball (not shown) into the rebound wall 8 and the ball contacts either slave panel 13 or 15, the slight angular displacement will tend to rebound the ball toward the player. Also, as shown in FIG. 3, each panel 10, 13 and 15 is tilted rearwardly (away from the player) about five degrees. This is so the ball is directed in rebound in a slight upward direction to compensate for gravity and loss of momentum in order for the ball to be returned to the player. Typically, the panels 10, 13 and 15 would be constructed of ABS plastic, however other materials of construction could be used.

Figure 2:
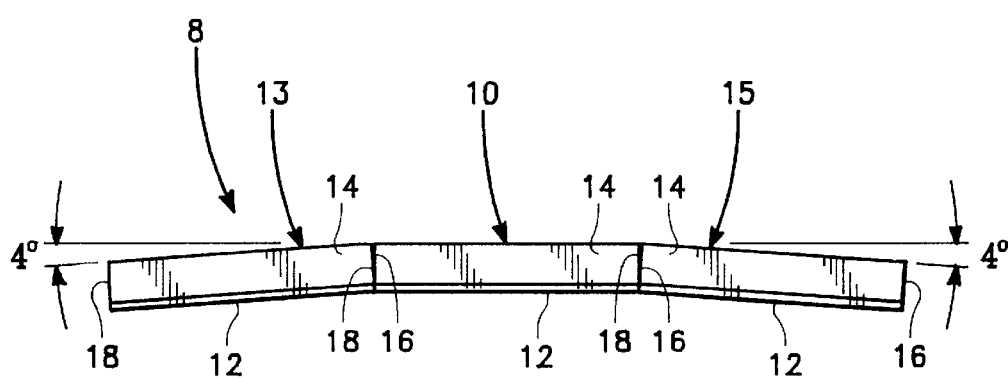
FIG. 2 is a top plan view of the panel assemblage of the rebound wall of this invention showing the angular displacement of the slave panels relative to the master panel forming a slight generally concave appearance facing the player taken along line 2—2 of FIG. 1.
Figure 5:
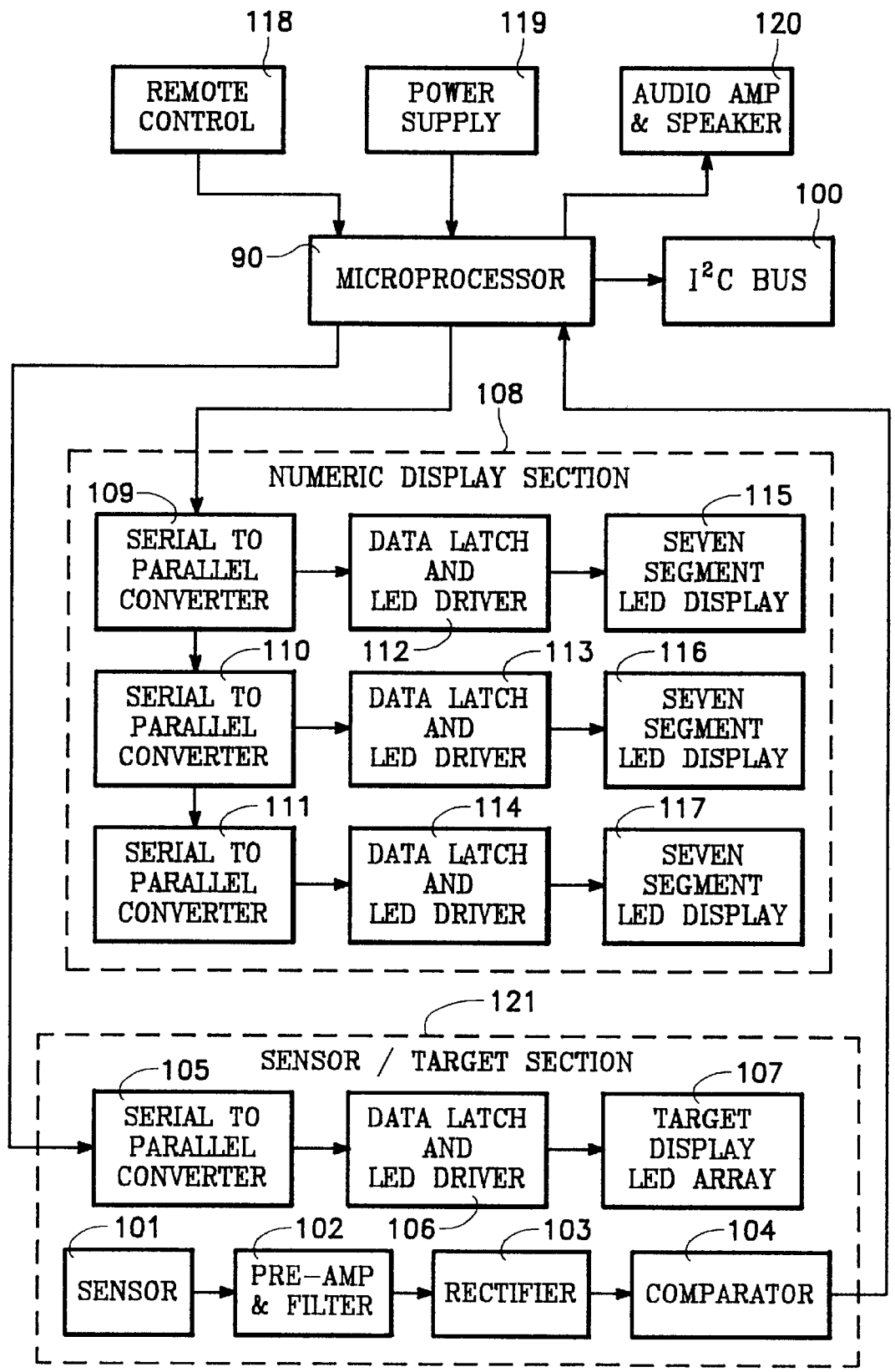
FIG. 5 is a block diagram of the electrical circuitry included within the wall of this invention.

Referring particularly to FIGS. 2 and 3, it can be seen that each panel 10, 13 and 15 is rectangular in shape having a planar front surface 12, a planar top edge 14, a planar right side edge 16, a planar left side edge 18 and a planar bottom edge 19 which is identical to top edge 14. Each panel 10, 13 and 15 is constructed of a front section 17 and a back section 21. Mounted on the back section 21 are a series of raised members which are of a height to become flush against the inside surface of the front section 17 when it is attached to the back section 21. These raised members are not shown and are required to make the panel 10, 13 and 15 a rigid structure. It is to be noted that for the purposes of this invention the actual configuration of each panel 10, 13 and 15 could be altered such as having the front surface 12 assume a slightly parabolic or dish shape. Each of the panels are about three and one-half inches thick, four feet wide and eight feet tall. It is to be understood that by using of the panels 10, 13 and 15 that the rebound wall becomes modular and expandable. The electrical wiring and electronics is imbedded within the panels 10, 13 and 15 so that such are hidden from view and, for safety reasons, are not contactable by any individual being in close proximity to the wall 8.

The rebound wall 8 constructed of a plurality of the panels 10, 13 and 15 can be designed for anyone of a variety of different sports. A great number of sports are required to use some form of a ball. The sports could include tennis, baseball, football, rugby, cricket, soccer, handball, plus others.

A principal feature of the present invention is that each of the panels 10 include imbedded electronic sensors which are to detect the point of impact and speed of impact of a ball. Imbedded within the front surface 12 are between five and nine in number of spaced-apart target areas 20 with only five in number being shown. These target areas 20 can vary in location on the panel 10. Each target area 20 connects with an internal box 22 each of which has an internal chamber 24. The display area 28 is designed to display desirable indicia such as time, score and/or player information. Player information would be, for example, if there were more than one player playing so you have player A and player B, and each player would have his or her own display area 28. Typically, only the display area 28 for the master panel 10 is used in the rebound wall 8 with the display area 28 of the slave panels 13 and 15 not being used. The display area 28 includes appropriate visual display electronics 115, 116 and 117 that is connected to a microprocessor 90.

Mounted within the internal chamber 24 of each of the internal boxes 22 is a piezoelectric transducer 34 and a target display LED array 107. Each display 107 can be set to be illuminated when a ball strikes within a certain distance of the display 107. For an expert, it is necessary that the ball would strike the particular target area 20 within a certain close proximity such as six inches. For a beginner, it may only be necessary that the ball strike in the general proximity of a target area 20. The electronics can cause a single target area 20 to be illuminated as opposed to the other target areas 20. The players then attempt to strike the ball so that it contacts in close proximity of the illuminated target area 20. Included within the panels 10, 13 and 15 are spare internal boxes 30 which can be used as additional target areas 20 when such is deemed to be desired. The internal boxes 30, each of which have an internal chamber 36, would normally not be included with a game of tennis, but could possibly be included with other types of games such as soccer or handball. Target areas 23 are used for the game of tennis to indicate a ball that is directed to the rebound wall 8 to low to go over the net in the normal game of tennis therefore target areas 23 are to indicate a negative value.

There may be formed within each corner of the panel 10 a corner box 32. Mounted within each internal chamber 45 of each corner box 32 is a sensor in the form of a piezo-electric transducer 34 or other type of suitable transducer. There may be mounted two in number of the transducers 34 within each corner box 32. The output of the transducer 34 is to be supplied to the display box 26 of the display area 28. It may be desirable to mount the piezoelectric transducers 34 at other locations such as a single transducer 34 in a box 36 located below the lowermost target areas 20.

The purpose of the piezoelectric transducers 34 is to function to pick up the acoustic/vibrational wave which is created by the ball when striking the rebound wall panel 8. The microprocessor 90 notes the time and magnitude that each transducer 34 picks up the acoustic/vibrational wave and by comparing of the times between the different transducers 34 is able to determine the point of origin of impact of the ball on the panel 10. This information can then be supplied to the display area 28 with appropriate information then being displayed to the player or players.

Also formed within each panel 10 are boxes 38 and 40. Box 38 is designed to have mounted therein a power supply 119. Box 40 is designed to have mounted therein control circuitry which uses a remote control 118. It is to be understood that the electronics can take any one of numerous different designs of electronics in order to achieve the same end result. Normally within either box 38 or 40 of only master panel 10 (not slave panels 13 and 15) there will also be included a speaker 120 with that speaker 120 to be used to relay to the player or players certain information, such as good shot, poor shot, a score value and so forth.

Another feature of the present invention is that each rebound wall panel 10 includes structure to deaden the sound of the impact of the ball on the panels 10, 13 and 15. This structure constitutes a hollow cavity 44 located about the boxes 22, 30, 32, 38 and 40. Access holes 50 and 52 connect with the hollow cavity 44. Sand 42 is to be poured through the access holes 50, and 52 to fill the hollow cavity 44. Each of the panels 10, 13 and 15 can be removed from its established position and replaced in a new position. When doing so, the sand 42 is to be removed by means of drain holes 54 and 56 in order to decrease the weight of each panel 10, 13 and 15. The sand 42 substantially increases the overall stability of the panels 10, 13 and 15. The use of sand 42 minimizes the effect of wind on the rebound wall 8. The adding of the sand 42 to each of the rebound wall panels 10 substantially deadens the sound of the strike of the ball against the panels 10, 13 and 15. It is desirable to eliminate this sound as sound can become quite annoying to someone who is located in close proximity to the panel but is not actually making use of the panel 10. Instead of sand 42 being used, other weighted particulate matter could be used such as small metal balls, commonly called shot. Also, a liquid could be used such as water.

A player can choose one of several interactive, skill enhancement games from a menu of preprogrammed electronic games. In addition, the player can regulate the skill level and score performance at his or her own level. Different games can be designed to use the target areas 20 and the transducers 34. For example, one of the games would be called "Chase the Target" which would have a particular target 20 to be randomly illuminated and the player would then attempt to strike a ball to hit that particular target. Once a ball has impacted either panel 10, 13 or 15, a determination is made as to how close that ball came to the specific illuminated target area 20 and a score is appropriately recorded. In addition, some type of sound feedback would be transmitted to the player or players, such as good shot or bad shot. A number of points would be applied depending on the length of time it takes to hit the particular target with the faster the ball reaches the illuminated target, the more points are earned. The aim of the game is to achieve the maximum number of points before the time expires for the allotted time of the game.

Additionally, a modem can be utilized to connect the panels 10 of the rebound wall of this invention to the Internet. Games could be played every so often and would be controlled at a particular central location. Players could register to play a preselected game or set of games and pay for usage with a credit card. The game would start at exactly the same time and would last a certain prescribed amount of time, such as sixty seconds in length. On completion, the score from each participating system will be transferred to the control center and the result will be redistributed back to each site within seconds. This would give the ability for players to play a particular rebound wall to compete with players all over the world. Also, players would be able to compete with a professional player or celebrity type competitor. The game could be programmed with a professional player. The programming would have as input where the ball would strike the wall 8 and the time between shots against the wall by the professional player. This could be arrived at by the professional player playing the wall or could be programmed into a program for the wall from an actual game played by the professional. Therefore, any individual could select to play in competition with the professional player if he or she so chooses.

The microprocessor 90 comprises a general purpose microcontroller such as manufactured by Microchip, Inc., of Santa Clara, Calif., part number PIC 16C63. The functions of the microprocessor are: (1) Gather data from the transducers 34; (2) Display player information on the targets 20 and on the display area 28; (3) Generate audio feedback to player through speaker 120; (4) Receive commands from a remote control 13; and (5) Communicate serially through an industry standard I²C serial communicator bus 100.

Sensor 101 of a sensor target section 121, comprises a piezoelectric transducer 34 attached to the panel in such a way to pick up panel vibrations or acoustic waves. The electrical signal from sensor 101 is then transmitted to a preamplifier and filter 102. It is to be understood that there are several of the transducers 34 with each being connected to a preamplifier and filter 102. The preamplifier and filter 102 conditions the signal to eliminate unnecessary data. The signal is then transmitted to a rectifier 103 where it is converted into a direct current (DC) format and then transmitted to a comparator 104 whose function is to determine the signal threshold necessary for the microprocessor 90 to determine the time and impact essentially providing an analog to digital conversion. This information is then transferred to the microprocessor 90.

The microprocessor 90 transmits serial data to each target display of the targets 20. This information is received by a serial-to-parallel converter 105. The parallel information, which represents the display pattern, is transmitted to data latch and LED driver 106. The information or target pattern is then displayed on the target display LED array 107.

The numeric display section 108 operates in a similar manner by using a series of converters 109, 110 and 111. Converter 109 connects to a data latch and LED driver 112. Converter 110 is connected to a data latch and LED driver 113. Converter 111 is connected to a separate data latch and LED driver 114. The data latch and LED driver 112 is connected to a seven segment LED display 115 which visually represents the hundredths digit. The data latch and LED driver 113 connect to a seven segment LED display 116 which visually represents the tenth's digit. The data latch and LED driver 114 is connected to a seven segment LED display 117 which visually displays the one's digit. It is to be understood that the displays 115, 116 and 117 could be used by turning of a switch to display either time, score or a player game number or countdown time. It is to be understood that there is an arrangement of the displays 115, 116 and 117 within each panel that is used in the rebound wall 8. Therefore, each arrangement of the display can be used to display a certain value.

The microprocessor 90 receives commands via a remote control 118. This remote control 118 is the commonly available radio frequency type. The power supply 119 is to have as its input conventional alternating current at 120 volts. This conventional current is transformed into 12VDC at each panel. Further output from the microprocessor 90 is the audio output which is transmitted to an audio amplifier and speaker 120.

The microprocessor 90 communicates to all slave panels 13 and 15 by means of an industry standard I2C bus 100. This bus 100 transmits all sensor, target and display data between each panel 10, 13 and 15. In addition, all control and command data is transmitted along this bus 100. It is intended that additional features could be added to the system, i.e., credit card readers, an internet modem, etc., which also communicate via the I²C bus 100.

The rebound wall of the present invention is designed for heavy duty use at locations such as health and fitness clubs, sports clubs, hotels, resorts, universities and recreation centers. The rebound wall of this invention is designed to promote physical fitness by allowing children and adults to exercise and get physical activity while having fun. Also, the rebound wall of the present invention is designed to improve motor skills, visual efficiency skills, and intellectual skills.

What is claimed:

1. A rebound wall for a ball sport game comprising:
    at least one thin panel having a bottom edge, said bottom edge adapted to rest on a supporting surface resulting in said panel assuming an upright configuration, said panel having a first front surface, said first front surface adapted to receive a propelled ball that is rebounded away from said first front surface, said panel including an enclosed hollow cavity, said hollow cavity adapted to contain a quantity of weighed matter to function to absorb sound when said panel is struck by a ball;
    said first front surface including at least one target area, said target area including illumination means, said illumination means to be activated to function as a target for a propelled ball;
    said first front surface also including sensor means, said sensor means for determining an impact point of a ball on said panel producing information accordingly; and
    display means for displaying said information.
2. The rebound wall for a ball sport game as defined in claim 1 wherein:
    there being a plurality of said target areas mounted within said first front wall, said target areas being located in a spaced-apart arrangement within said panel.
3. The rebound wall for a ball sport game as defined in claim 1, wherein:
    said display means being mounted within said panel.
4. The rebound wall for a ball sport game as defined in claim 1 wrherein:
    there being a second thin panel which is interconnected and located in juxtaposition to said one thin panel, said second thin panel being separate from said first thin panel, said second thin panel having a second front surface.
5. The rebound wall for a ball sport game as defined in claim 4 wherein:
    said second thin panel being angularly disposed relative to said first thin panel so said second front surface is not parallel to said first front surface.
6. The rebound wall for a ball sport game as defined in claim 5 wherein:
    both said first thin panel and said second thin panel being tilted rearwardly from the player in order to rebound the ball in an upward flight direction.
7. The rebound wall for a ball sport game as defined in claim 6 wherein:
    thereby a third thin panel which is interconnected and located in juxtaposition to both said first thin panel and said second thin panel.
8. The rebound wall for a ball sport game as defined in claim 7 wherein:
    said first thin panel being located between said second thin panel and said third thin panel.

* * * * *